United States Patent
Brown et al.

(10) Patent No.: US 12,018,185 B2
(45) Date of Patent: Jun. 25, 2024

(54) ADHESIVE COMPOSITIONS AND METHODS OF MAKING THE SAME

(71) Applicant: Bemis Associates, Inc., Shirley, MA (US)

(72) Inventors: Richard A. Brown, Danville, NH (US); Jared M. Ide, Somerville, MA (US); Daryl R. Johnson, Fitchburg, MA (US); Stephen A. Topper, Barre, MA (US)

(73) Assignee: Bemis Associates, Inc., Shirley, MA (US)

(*) Notice: Subject to any disclaimer, the term of this patent is extended or adjusted under 35 U.S.C. 154(b) by 588 days.

(21) Appl. No.: 16/910,733

(22) Filed: Jun. 24, 2020

(65) Prior Publication Data

US 2020/0407608 A1 Dec. 31, 2020

Related U.S. Application Data

(60) Provisional application No. 62/867,828, filed on Jun. 27, 2019.

(51) Int. Cl.
*C09J 175/04* (2006.01)
*C09J 177/00* (2006.01)

(52) U.S. Cl.
CPC ........... *C09J 175/04* (2013.01); *C09J 177/00* (2013.01)

(58) Field of Classification Search
CPC ......... C09J 175/04; C09J 175/06; C08L 77/00
See application file for complete search history.

(56) References Cited

U.S. PATENT DOCUMENTS

| | | |
|---|---|---|
| 4,636,546 A | 1/1987 | Chao |
| 4,775,719 A | 10/1988 | Markevka et al. |
| 4,980,404 A | 12/1990 | Aydin et al. |
| 5,166,302 A | 11/1992 | Werner et al. |
| 5,472,498 A * | 12/1995 | Stephenson ......... C04B 20/1044 428/407 |
| 5,747,102 A | 5/1998 | Smith et al. |
| 5,932,680 A | 8/1999 | Heider |
| 5,939,499 A | 8/1999 | Anderson et al. |
| 6,133,400 A | 10/2000 | Helmeke |
| 6,355,317 B1 | 3/2002 | Reid et al. |
| 6,548,579 B2 | 4/2003 | Reski et al. |
| 6,844,073 B1 | 1/2005 | Helmeke et al. |
| 7,228,809 B2 | 6/2007 | Angelino et al. |
| 7,699,929 B2 * | 4/2010 | Guevara ................. C04B 28/02 106/713 |
| 8,574,698 B2 | 11/2013 | Fung et al. |
| 9,932,268 B2 | 4/2018 | Dombrowski et al. |
| 2002/0010256 A1 * | 1/2002 | Reski .................... B42C 9/0006 524/502 |
| 2006/0046949 A1 | 3/2006 | Ito et al. |
| 2007/0084390 A1 | 4/2007 | Angelino et al. |
| 2008/0302460 A1 | 12/2008 | Angelino et al. |
| 2008/0312361 A1 | 12/2008 | Wintermantel et al. |
| 2009/0047481 A1 | 2/2009 | Welsch et al. |
| 2011/0262737 A1 | 10/2011 | Fung et al. |
| 2014/0288202 A1 | 9/2014 | Dombrowski et al. |
| 2015/0133014 A1 | 5/2015 | Traser et al. |
| 2017/0088758 A1 | 3/2017 | Bzowej et al. |

FOREIGN PATENT DOCUMENTS

| | | | |
|---|---|---|---|
| CN | 106490699 A | 3/2017 | |
| DE | 19610797 A1 | 9/1997 | |
| EP | 444542 A * | 9/1991 | ........... C04B 22/124 |
| EP | 1897926 A1 | 3/2008 | |
| WO | WO-1991/015530 A1 | 10/1991 | |

OTHER PUBLICATIONS

International Search Report from PCT/US2020/039330, dated Nov. 23, 2020.
Zidan, S., et al., "Investigating the Mechanical Properties of ZrO2-Impregnated PMMA Nanocomposite for Denture-Based Applications," Materials, 12(8): 1344 (2019).

* cited by examiner

*Primary Examiner* — Michael M Dollinger
(74) *Attorney, Agent, or Firm* — Morse, Barnes-Brown & Pendleton, P.C.; Sean D. Detweiler, Esq.

(57) ABSTRACT

Disclosed herein are improved adhesive compositions for bonding textiles and methods of producing the same.

41 Claims, No Drawings

ADHESIVE COMPOSITIONS AND METHODS OF MAKING THE SAME

RELATED APPLICATIONS

This application claims the benefit of U.S. Provisional Application No. 62/867,828, filed Jun. 27, 2019, the teachings of which are incorporated herein by reference.

BACKGROUND OF THE INVENTION

Current automated liquid adhesive jetting systems used in the textile industry are generally 100% solids reactive systems. These jetting systems require special packaging, such as aluminum foil to eliminate moisture ingress, to preserve the reactivity of the system, which produces a large amount of waste. Moreover, these jetting systems require special safety and handling procedures, and the final clean-up of the equipment is time consuming, produces hazardous waste, and may require the use of aggressive solvents. These reactive jetting systems are also very expensive and may require a set time of twenty-four hours or more before the full bond strength is realized. In some instances, jetting systems may be two component systems where the two components are stored separately and then mixed, such as when two components are stored separately, but combined in the jetting nozzle just prior to deposition. These two component systems exhibit certain problems, such as the hazards of having two individual components (e.g., where one might be live isocyanate), the possible need for skilled operation, and difficult clean up from having two separate components.

Current preferred heat activated, non-reactive, bonding systems for textiles utilize an extruded thermoplastic polyurethane (TPU) adhesive film. Other bonding systems are also known that utilize alternative chemistries, such as olefins, polyamides, and polyesters. These processes generally produce more film than is required for bonding fabrics, as it is supplied in a continuous/solid adhesive tape or sheet from which the desired length or shape is cut. Moreover, these adhesives are often supplied on a release liner, which is typically discarded as waste. Therefore, there is an increased raw material cost, as well as an increase in waste of unused adhesive film. In addition, the continuous tape decreases breathability and flexibility in fabric that has been bonded using the tape. Moreover, the continuous film when used on a fabric seam may adversely affect the mechanical and physical properties of the garment (so-called recovery), while the use of spaced adhesive dots to create the bond will allow the underlying textile to maintain its physical properties. There is a need for a cost effective, environmentally safe adhesive that produces a strong bond and maintains the features of the fabric the adhesive is applied to.

SUMMARY OF THE INVENTION

Disclosed herein are adhesive compositions that exhibit various improvements over current adhesive formulations. The disclosed adhesives produce a strong bond between two pieces of fabric, while allowing the fabric to maintain flexibility and breathability. In addition, the adhesive may be deposited on a piece of fabric as adhesive dots, and the fabric pieces, which carry adhesive dots on one surface in a manner akin to "tacking" of an adhesive film, may be set aside for storage or transport prior to the bonding process being completed. The adhesive dots on the surface of the fabric are not sticky or tacky, and are fully dried. This provides numerous additional benefits, including reducing waste, and allowing the bonding process to be broken down into individual steps (e.g., preparing/cutting fabric, applying adhesive, storing/shipping fabric with applied adhesive, and completing the bonding process).

Disclosed herein are adhesive compositions. Adhesive compositions comprise an aqueous polymer dispersion; a dispersed polymer powder, wherein the polymer powder has a particle size of about 0 microns to about 250 microns; a dispersing agent; and a thickener.

In some embodiments, the aqueous polymer dispersion is selected from the group consisting of aqueous polyurethane-urea anionomer dispersion (also referred to as a polyurethane dispersion (e.g., an aliphatic polyester polyurethane dispersion)), aqueous acrylic emulsions, aqueous styrene acrylic emulsions, aqueous acrylic vinyl acetate emulsions, aqueous epoxy dispersions, aqueous polyamide dispersions, aqueous polyester dispersions, and combinations thereof. In some embodiments, the aqueous polymer dispersion is a blend of two or more polyurethane dispersions. In some embodiments, the aqueous polymer dispersion is a blend of a polyurethane dispersion and an acrylic emulsion. In some embodiments, the aqueous polymer dispersion is a polyurethane dispersion which can act as a dispersant capable of stabilizing a dispersion of a polymeric powder in water.

In some embodiments, the polymer powder is selected from the group consisting of co-polyesters, polyurethane powder, polyester urethanes, polyether urethanes, ethylene vinyl acetates, co-polyamides, polyamides, polyureas, polyolefins, polycarbonate urethanes, epoxy polyesters, and combinations thereof. In some embodiments, the polymer powder is present in the adhesive composition in an amount of about 10 wt % to about 40 wt %, in an amount of about 15 wt % to about 35 wt %, or in an amount of about 20 wt % to about 30 wt %.

In some embodiments, the dispersing agent is selected from the group consisting of a surfactant (e.g., non-ionic surfactant, anionic surfactant, and/or combinations thereof), a polymer dispersant (e.g., an acrylic polymer, a polyurethane, and/or combinations thereof), and combinations thereof. In some embodiments, the dispersing agent is present in the adhesive composition in an amount of about 0.1 wt % to about 2.0 wt %, in an amount of about 0.5 wt % to about 1.5 wt %, or in an amount of about 0.8 wt % to about 1.2 wt %.

In some embodiments, the thickener is a water based acrylic. In some embodiments, the thickener is selected from the group consisting of a hydrophobically modified ethoxylated urethane (HEUR) thickener, a hydrophobically modified alkali swellable emulsion (HASE) thickener, a hydroxyethyl cellulose (HEC) thickener, a cellulosic thickener, an inorganic thickener, and combinations thereof. In some embodiments, the thickener is present in the adhesive composition in an amount of about 0.1 wt % to about 2.0 wt %, or in an amount of about 0.3 wt % to about 0.7 wt %.

In some embodiments, the adhesive composition further includes an additive. In some embodiments, the additive promotes flocculation. In some embodiments, the additive is a polyethyleneimine. In some embodiments, the additive is present in the adhesive composition in an amount of about 0 wt % to about 2 wt %, in an amount of about 0 wt % to about 1 wt %, or in an amount of about 0 wt % to about 0.5 wt %.

In some embodiments, the adhesive composition further includes a crosslinking agent. In some embodiments, the crosslinking agent is selected from the group consisting of blocked or encapsulated multi-functional isocyanate, carbodiimides, Schiffs-base crosslinkers, alkyd modified polyurethanes, aceto-acetate functional polymers combined with multi-functional polyamines, and UV crosslinkers. In some embodiments, the aqueous polymer dispersion includes a carbodiimide crosslinker. In some embodiments, the adhesive composition does not include a cross linking agent.

In some embodiments, the adhesive composition has a solids content of about 5 wt % to about 55 wt % or about 15 wt % to about 20 wt %. In some embodiments, the adhesive composition comprises the aqueous polymer dispersion and the polymer powder at a ratio range of about 1:0.2 to about 1:1.15, at a ratio range of 1:03 to about 1:1.2, at a ratio of 1:0.38, or at a ratio of 1:1.14. In some embodiments, the adhesive composition has a viscosity within the range of 5000 cps to 20000 cps or within the range of 8000 cps to 12000 cps.

Also disclosed herein are methods of producing an adhesive composition. The methods comprise adding one or more liquid components to a mixing vessel, wherein the one or more liquid components include an aqueous polymer dispersion, water, and a dispersing agent; mixing the liquid components in the mixing vessel at a sufficient speed to create a vortex; adding a polymer powder to the mixed liquid components to form an adhesive composition; and adding a thickener to the adhesive composition.

In some embodiments, the liquid components are mixed at a speed of 500 to 1500 rpm or at a speed of 800 to 1000 rpm. In some embodiments, the liquid components mixing speed is selected based on the size of the mixing vessel. In some embodiments, the mixing vessel is a 250 ml, 1 L, 5 gallon, or 55 gallon mixing vessel. In some embodiments, the polymer powder is added to the center of the vortex. In some embodiments, the polymer powder is added in an amount that is quickly dispersed into the mixed liquid components.

In some embodiments, the thickener is added dropwise to the adhesive composition. In some embodiments, the thickener is added at 18 drops to the adhesive composition. In some embodiments, the adhesive composition is mixed for about 8 to 10 minutes after adding the thickener. In some embodiments, the thickener is added to the adhesive composition in an amount resulting in the adhesive composition having a viscosity of 8000 cps to 12000 cps.

DETAILED DESCRIPTION OF THE INVENTION

Disclosed herein are adhesive compositions that exhibit various improvements over current adhesive formulations. The disclosed adhesives produce a strong bond between two pieces of fabric, while allowing the fabric to maintain flexibility and breathability. In addition, the adhesive may be deposited on a piece of fabric as adhesive dots, and the fabric pieces, which carry adhesive dots on one surface, may be set aside for storage or transport prior to the bonding process being completed.

Aspects of the invention are directed to adhesive compositions. In some embodiments, the adhesive composition comprises an aqueous polymer dispersion, a polymer powder, a dispersing agent, and a thickener.

"Aqueous polymer dispersion," "aqueous polymer emulsion," and "aqueous polymer colloid" are used herein interchangeably. In some aspects, an aqueous polymer dispersion is a single polymer dispersion. In other aspects, an aqueous polymer dispersion is a blend of two or more aqueous polymer dispersions. In some aspects, the aqueous polymer dispersion acts as a dispersant. The aqueous polymer dispersion is a single aqueous polymer dispersion, or a blend of two or more aqueous polymer dispersions, which is capable of stabilizing a dispersion of a polymeric powder in water. In certain aspects, the aqueous polymer dispersion is selected from the group consisting of aqueous polyurethane-urea anionomers (also referred to herein as polyurethane dispersions or PUDs), aqueous acrylic emulsions, aqueous styrene acrylic emulsions, aqueous acrylic vinyl acetate emulsions, aqueous epoxy dispersions, aqueous polyamide dispersions, aqueous polyester dispersions (e.g., alkyds), and combinations thereof. As used herein, "acrylic" covers copolymers of any acrylic or methacrylic monomer, such as methyl methacrylate, n-butyl acrylate, ethyl hexyl acrylate, n-butyl methacrylate, acrylic acid, methacrylic acid, and the like.

In some embodiments, the aqueous polymer dispersion is an aqueous polyurethane dispersion or an aqueous acrylic emulsion. In some embodiments, the aqueous polymer dispersion is an aqueous polyurethane dispersion (e.g., an aliphatic polyester polyurethane). In some embodiments, the aqueous polymer dispersion is a blend of at least two polyurethane dispersions (e.g., a low molecular weight polyurethane dispersion (i.e., less than about 30,000 molecular weight) and a high molecular weight polyurethane dispersion (i.e., greater than about 60,000 molecular weight)). In some embodiments, the aqueous polymer dispersion is a blend of at least two polyurethane dispersions having a combined molecular weight of about 20,000 to about 120,000. In some embodiments, the aqueous polymer dispersion is a blend of a polyurethane dispersion and an aqueous acrylic emulsion. Non-limiting examples of polyurethane dispersions include: NeoRez R-9621 from DSM; the Dispercoll range from Covestro, including Dispercoll U56, Dispercoll U42, Dispercoll U54, and Dispercoll XP 2682; and Sancure 20025F from Lubrizol. Non-limiting examples of acrylic emulsions or styrene acrylic emulsions include: Acronal 220na and Acronal A310S from BASF; Plextol R 123 from Synthomer; SC 6074 from StanChem Polymers; and the Carbotac products from Lubrizol, such as Carbotac 1814 acrylic emulsion. An acrylic emulsion may be selected based on its ability to provide crosslinking to the aqueous polymer dispersion. For example, Acronal 220na is an all acrylic emulsion that does not include crosslinking, while Acronal A310S is an acrylic emulsion that contains a self-crosslinking mechanism. Non-limiting examples of vinyl acetate emulsions include: polymers from AkzoNobel; polymers from Celanese; and polymers from StanChem, such as SC5019 grade vinyl acetate polymer dispersion. Non-limiting examples of aqueous epoxy dispersions include: Epi-rez water dispersed epoxy resins from Hexion, such as Epi-rez 3522-W-60. Non-limiting examples of aqueous polyamide dispersions include: polymers from Michelman, such as Michem emulsion D310. Non-limiting examples of aqueous polyester dispersions include: Eastek polymers from Eastman, such as Eastek 1000 polymer dispersion.

An aqueous polymer dispersion comprises particles dispersed in a medium (e.g., water). The particles may have a low particle size (sometimes referred to as a fine particle size) or a high particle size. In some aspects, particle size correlates with solids content. For example, an aqueous polymer dispersion comprising particles having a very low particle size may have a low solids content. Alternatively, an aqueous polymer dispersion comprising particles having a high particle size may have a higher solids content. In some aspects, the aqueous polymer dispersion has a solids content of about 10 wt % to about 50 wt %, about 15 wt % to about 45 wt %, about 20 wt % to about 40 wt %, or about 25 wt % to about 35 wt %, based on the total weight of the dispersion. In some aspects, the aqueous polymer dispersion has a solids content of about 35 wt % to about 40 wt % or about 38 wt %. In some aspects, the aqueous polymer dispersion provides about 5 wt % to about 30 wt %, about 10 wt % to about 25 wt %, or about 15 wt % to about 20 wt % of solid polymer to the adhesive composition, based on the total weight of the adhesive composition. In some embodiments, the aqueous polymer dispersion provides about 24 wt % of solid polymer to the adhesive composition. In some embodiments, the aqueous polymer dispersion provides about 8 wt % of solid polymer to the adhesive composition.

In some aspects, a polymer powder is a dispersed polymer powder. In some aspects, a polymer powder is a cryo-ground polymer powder. In some aspects, the polymer powder has a particle size of about 0 microns to about 500 microns, about 0 microns to about 400 microns, about 0 microns to about 300 microns, about 0 microns to about 250 microns, about 0 microns to about 200 microns, about 0 microns to about 150 microns, or about 0 microns to about 100 microns. In some embodiments, the polymer powder has a particle size of about 0 microns to about 170 microns or about 0 microns to about 80 microns. In some aspects, the polymer powder has a particle size that is less than 170 microns, less than 160 microns, less than 150 microns, less than 140 microns, less than 130 microns, less than 120 microns, less than 110 microns, less than 100 microns, less than 90 microns, or less than 80 microns. The particle size of the polymer powder may be determined by the nozzle size of the jetting system. For example, the maximum particle size will be ⅓ the diameter size of the nozzle.

In some embodiments, the polymer powder is selected from the group consisting of co-polyesters, polyester urethanes, polyether urethanes, ethylene vinyl acetates, co-polyamides, polyamides, polyureas, polyolefins, polycarbonate urethanes, epoxy-polyester, and combinations thereof. A polymer powder may be selected based on its adhesion ability to a specific substrate and/or its molecular weight and molecular weight distribution which can impact the ability to melt flow during bonding. In certain embodiments, the polymer powder is a polyamide. In certain embodiments, the polymer powder is a polyurethane powder. In certain embodiments, the polymer powder is a polycarbonate urethane. Non-limiting examples of polymer powders include: TPU 4529 and TPU 4073 from Fixatti; and Griltex 1A, Griltex 2A, and Griltex 9E from EMS-Griltech.

In some aspects, the polymer powder is about 0 wt % to about 45 wt %, about 10 wt % to about 40 wt %, about 15 wt % to about 35 wt %, or about 20 wt % to about 30 wt % of the adhesive composition, based on the total weight of the adhesive composition. In certain embodiments, the polymer powder is about 20 wt % of the adhesive composition. In certain embodiments, the polymer powder is about 30 wt % of the adhesive composition.

In some aspects, a dispersing agent is a surfactant and/or a polymer dispersant. In some aspects, a dispersing agent is a non-ionic surfactant (e.g., alkyl phenol ethoxylates (APEO) non-ionic surfactants or APEO free non-ionic surfactants), an anionic surfactant (e.g., sodium lauryl sulfate or sodium dioctyl sulfosuccinate), or a combination or hybrid of a non-ionic surfactant and an anionic surfactant (e.g., sodium lauryl ether sulfate (SLES)). In some aspects, a dispersing agent is an acrylic polymer dispersant (e.g., an acid rich acrylic polymer where the acid functional moiety is acrylic acid, methacrylic acid, or combinations of both) or a polyurethane dispersant (e.g., an acid rich polyurethane where the acid functionality is provided by, for example, dimethylol propionic acid (DMPA)). Non-limiting examples of dispersing agents include: Dowfax 3B2 from Dow; Dispex AA and Dispex CX from BASF; Metolat 355 and Metolat 388 from Munzig; Jeffsperse X3503 from Huntsman; Zetasperse 2500 from Evonik; and Altoma Carrier 10628 from Bolger & O'Hearn.

The amount of dispersing agent included in the adhesive composition is dependent on the total amount of polymer powder, as well as the particle size of the polymer powder. In addition, the amount of dispersing agent included in the adhesive composition may also be affected by the aqueous polyurethane dispersion (e.g., the amount of the dispersion included in the composition, as well as how effective the dispersion is as a dispersant). In some aspects, the dispersing agent may be about 0.1 wt % to about 2.0 wt %, about 0.5 wt % to about 1.5 wt %, or about 0.8 wt % to about 1.2 wt % of the adhesive composition, based on the total weight of the adhesive composition. In some aspects, the dispersing agent is about 1.1 w % of the adhesive composition.

In some embodiments, a thickener is a water based acrylic. A thickener may be selected from the group consisting of a hydrophobically modified ethoxylated urethane (HEUR) thickener, a hydrophobically modified alkali swellable emulsion (HASE) thickener, a hydroxyethyl cellulose (HEC) thickener, a cellulosic thickener, an inorganic thickener (e.g., bentonite clays), and combinations thereof. A thickener may be selected based on the shear range that the adhesive composition will be exposed to. For example, a resting viscosity would be a low shear, and movement through a jetting nozzle would be a high shear. Non-limiting examples of thickeners include: Altoma 1953 from Bolger & O'Hearn; Acrysol ASE-60, Acrysol DR-106, and Acrysol RM-845 from Dow; Rheovis PU 1251 from BASF; Borchi Gel ALA from Borchers GmbH; Coapur 6050 from Arkema; and Tego Rheo 8510 from Evonik.

A thickener may be added to the adhesive composition to modulate the viscosity of the adhesive composition to a viscosity within the range of about 2000 cps to about 50000 cps, about 3000 cps to about 40000 cps, about 4000 cps to about 30000 cps, about 5000 cps to about 20000 cps, about 6000 cps to about 18000 cps, about 7000 cps to about 15000 cps, or about 7000 cps to about 15000 cps. In certain embodiments, a thickener is added to the adhesive composition to modulate the viscosity of the adhesive composition to a viscosity within the range of about 8000 cps to about 12000 cps. In some embodiments, the thickener is about 0.1 wt % to about 2.0 wt %, about 0.2 wt % to about 1.5 wt %, about 0.3 wt % to about 1.0 wt %, or about 0.3 to about 0.7 wt % of the adhesive composition, based on the total weight of the adhesive composition. In certain embodiments, the thickener is about 0.5 wt % of the adhesive composition.

In some embodiments, an adhesive composition further comprises an additive, (e.g., an additive that promotes flocculation). In some aspects, an additive is a polyethyleneimine. Non-limiting examples of polyethylene imines include the Lupasol range from BASF (e.g., Lupasol FG), the Epomin range from Nippon Shokubai, polyethylene imine grades from Gobekie, and polyethylene imine grades from Wuhan Qianglon Chemical. In some embodiments, the additive is about 0 wt % to about 2 wt %, about 0 wt % to about 1 wt %, or about 0 wt % to about 0.5 wt of the adhesive composition, based on the total weight of the adhesive composition.

In some embodiments, an adhesive composition further comprises a crosslinking agent (e.g., a reactive component to allow the system to crosslink). In some aspects, the crosslinking agent is selected from the group consisting of blocked or encapsulated multi-functional isocyanate, carbodiimides, Schiffs-base crosslinkers, alkyd modified polyurethanes, aceto-acetate functional polymers combined with multi-functional polyamines, UV crosslinkers, and polyaziridines (e.g., CX100 from DSM).

In some embodiments, the aqueous polymer dispersion includes a carbodiimide crosslinker. The crosslinker may act as a stabilizer when added to the aqueous polymer dispersion. For example, the crosslinker may partially compensate for the reduction in molecular weight which occurs to a polyester polyurethane in an aqueous dispersion as it ages over time. In some aspects, the amount of carbodiimide crosslinker added to the aqueous dispersion is less than 2% of the total formula (i.e., no more than 1% based on the total active solids of the aqueous dispersion). A non-limiting example of a carbodiimide crosslinker is Desmodur XP2802 from Covestro.

In some embodiments, an adhesive composition excludes (i.e., does not comprise) a crosslinking agent.

In some embodiments, an adhesive composition comprises an aqueous polymer dispersion (e.g., a polyurethane dispersion), a dispersed polymer powder (e.g., a polyamide), wherein the polymer powder has a particle size of about 0 microns to about 250 microns, a dispersing agent (e.g., a surfactant), and a thickener (e.g., a water based acrylic). In some aspects, the adhesive composition further comprises water, additives, crosslinking agents, tackifying resin dispersions (e.g., Sylvalite 9000 rosin ester tackifier, a biobased tackifier from Kraton, which can be formulated with water based systems), plasticizers (e.g., Eastek 1300 water dispersed sulfopolyester polymer dispersion from Eastman), rheology modifiers, antifoam agents (e.g., Foamaster MO 2170, a zero VOC defoamer from BASF; FoamBlast 301S from DyStar; and/or Byk 1786 from Byk), biocides (e.g., Mergal CM1.5 from Troy), pigments (e.g., carbon black or TiO2 pigments), colorants (e.g., colorants from Clamant and/or BASF, such as Colanyl White R500 (TiO2) from Clamant, Colanyl Black N 500-MX from Clamant, Aurasperse II W-7016 carbon black from BASF, and Colanyl Red D3GD 530 VP6154 from Clamant), curing agents, fillers (e.g., Sipernat 500LS precipitated silica from Evonik), adhesion promoters (e.g., multi-functional aziridines, such as CX100 multifunctional aziridine from DSM), and mixtures thereof.

In certain embodiments, the adhesive composition comprises an amount of polymer powder and an amount of an aqueous polymer dispersion in a ratio of about 1:0.2 to about 1:1.5, or about 1:0.3 to about 1:1.2. In certain embodiments, the adhesive composition comprises an amount of polymer powder and an amount of an aqueous polymer dispersion in a ratio of about 1:0.38. In certain embodiments, the adhesive composition comprises an amount of polymer powder and an amount of an aqueous polymer dispersion in a ratio of about 1:1.14.

In some aspects, the amount of a dispersing agent and a thickener present in the adhesive composition is dependent on the chosen solids content and/or the relative amounts of the polymer dispersion and polymer powder in the adhesive composition. In certain aspects, the adhesive composition comprises a dispersing agent at a ratio of 1:0.06 to the polymer powder. In some aspects, the adhesive composition comprises about 0.5 wt % to about 2 wt % dispersing agent. In certain aspects, the adhesive composition comprises about 1.2 wt % dispersing agent. In some aspects, the adhesive composition comprises 0.1 wt % to about 2 wt % of a thickener. In certain aspects, the adhesive composition comprises 0.3 wt % to about 0.7 wt %.

In some embodiments, the adhesive composition has a solids content of about 5 wt % to about 55 wt %, about 10 wt % to about 40 wt %, about 15 wt % to about 30 wt %, or about 15 wt % to about 20 wt %. In certain embodiments, the adhesive composition has a solids content sufficient to allow the jetted adhesive composition to be deposited onto a textile and not be absorbed into the textile.

The adhesive composition described herein may be prepared by mixing all of the liquid components (e.g., the aqueous polymer dispersion and a dispersing agent) and then adding the polymer powder. After the polymer powder has been mixed into the dispersion, the thickener may be added as needed to achieve the desired viscosity of the adhesive composition.

Disclosed herein are methods of producing an adhesive composition comprising adding one or more liquid components to a mixing vessel, wherein the one or more liquid components include an aqueous polymer dispersion, water, and a dispersing agent; mixing the liquid components in the mixing vessel at a sufficient speed to create a vortex; adding a polymer powder to the mixed liquid components to form an adhesive composition; and adding a thickener to the adhesive composition.

In some embodiments, the liquid components are mixed at a speed of about 500 rpm to about 1500 rpm, or about 800 rpm to about 1000 rpm. In certain embodiments, the liquid components are mixed at a speed of about 1000 rpm. In some aspects, the liquid components mixing speed is selected based on the size of the mixing vessel. The mixing vessel may be a 250 ml, 1 L, 5 gallon, or 55 gallon mixing vessel (e.g., a 250 ml polyethylene vessel). It is generally understood that the size of the mixing vessel may be increased as the manufacturing of the adhesive composition is scaled up.

In some embodiments, the polymer powder is added to the center of the vortex. The polymer powder may be added in an amount that is quickly dispersed into the mixed liquid components. In some aspects, the polymer powder is added slowly to the moving vortex.

In some embodiments, the thickener is added dropwise to the adhesive composition. For example, the thickener may be added at 18 drops to the adhesive composition. After adding the thickener, the adhesive composition may be mixed for about 8 minutes to about 10 minutes. In some embodiments, the viscosity of the adhesive composition is measured after the thickener is added and the adhesive composition is mixed. If the adhesive composition does not have the desired viscosity (e.g., about 8000 cps to about 12000 cps) additional thickener may be added accompanied by further mixing. This step may be repeated until the desired viscosity of the adhesive composition is reached.

The adhesive composition described herein exhibits various unique features. For example, the adhesive composition may be deposited as liquid dots on a surface (e.g., fabric) via a piezo-electric nozzle using compressed air. Typically, an adhesive composition comprising a solids content of about 28 wt %, which consists of a dispersed polymer having a particle size in the range of about 40 to about 300 nm in combination with a dispersed polymer powder within the size range of about 2 to about 250 micron in an aqueous medium, would result in coagulation/flocculation of the adhesive composition under high shear and/or drying or skinning around the nozzle of the jet. However, due to the high level of dispersant included in the adhesive composition, the expected coagulation and drying/skinning of the nozzle are inhibited. In addition, the rheology of the formulation allows for the continuous operation of the jetting nozzles and deposition of adhesive dots on a surface. The dot is able to sit on the surface of the textile without fully penetrating the fabric, thereby allowing the adhesive to be bonded at a later time.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

It is to be understood that the inventions disclosed herein are not limited in their application to the details set forth in the description or as exemplified. The invention encompasses other embodiments and is capable of being practiced or carried out in various ways. Also, it is to be understood that the phraseology and terminology employed herein is for the purpose of description and should not be regarded as limiting.

While certain compositions and methods of the present invention have been described with specificity in accordance with certain embodiments, the following examples serve only to illustrate the methods and compositions of the invention and are not intended to limit the same.

EXEMPLIFICATION

Example 1: Adhesive Composition Formulations

Adhesive Composition I
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition II:
Components:
1. Sancure 20025F supplied by Lubrizol (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition III:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition IV:
1. Dispercoll U54 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition V:
1. Dispercoll U42 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition VI:
1. NeoRez R 9630 aqueous aliphatic polyurethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition VII.
1. NeoRez R 9249 aqueous, non-ionic, aromatic polyurethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition VIII:
1. Roymal #47884 aliphatic polyurethane supplied by Roymal (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition IX
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 2A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition X
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 9E co-polyester powder supplied by EMS-Griltech (polymer powder); 20 g
5. Altoma clear conc #1953 acrylic emulsion thickener supplied by Bolger & O'Hearn (thickener); 0.5 g Adhesive Composition XI
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition XII
Components:
1. NeoRez R 9621 aliphatic polyester waterborne urethane supplied by DSM (aqueous polymer dispersion); 20 g
2. Deionized water; 39.5 g 3. Altoma carrier 10628 dispersant supplied by Bolger & O'Hearn (dispersant); 20 g
4. UNEX 4529 powder supplied by Fixatti (polymer powder); 20 g
5. Altoma clear conc #1953 acrylic emulsion thickener supplied by Bolger & O'Hearn (thickener); 0.5 g Adhesive Composition XIII
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. TPU6511B (0-100 micron) polyurethane powder supplied by Fixatti (polymer powder); 20 g
5. Rheovis PU 1291 thickener supplied by BASF (thickener); amount 0.5 g Adhesive Composition XIV
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. TPU4126 (0-100 micron) polyurethane powder supplied by Fixatti (polymer powder); 20 g
5. Altoma clear conc #1953 acrylic emulsion thickener supplied by Bolger & O'Hearn (thickener); 0.5 g Adhesive Composition XV
Components:
1. NeoRez R 9621 aliphatic polyester waterborne urethane supplied by DSM (aqueous polymer dispersion); 20 g
2. Deionized water; 39.25 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g
6. Rheovis PU 1291 thickener supplied by BASF (secondary thickener); amount 0.25 g Adhesive Composition XVI
Components:
1. NeoRez R 9621 aliphatic polyester waterborne urethane supplied by DSM (aqueous polymer dispersion); 20 g
2. Deionized water; 39.25 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g
6. Rheovis PU 1291 thickener supplied by BASF (secondary thickener); amount 0.25 g Adhesive Composition XVII
Components:
1. NeoRez R 9621 aliphatic polyester waterborne urethane supplied by DSM (aqueous polymer dispersion); 20 g
2. Deionized water; 39.25 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g
6. Rheovis PU 1291 thickener supplied by BASF (secondary thickener); amount 0.25 g Adhesive Composition XVIII
Components:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition XIX
Components:
1. Sancure 20025F supplied by Lubrizol (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition XX
Components:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4529 polyurethane powder supplied by Fixatti (polymer powder); 20 g
5. Altoma clear conc #1953 acrylic emulsion thickener supplied by Bolger & O'Hearn (thickener); 0.5 g Adhesive Composition XXI
Components:
1. Dispercoll U54 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4529 polyurethane powder supplied by Fixatti (polymer powder); 20 g
5. Altoma clear conc #1953 acrylic emulsion thickener supplied by Bolger & O'Hearn (thickener); 0.5 g Adhesive Composition XXII:
Components:
1. Dispercoll XP 2682 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition XXIII
Components:
1. Dispercoll XP 2682 supplied by Covestro (aqueous polymer dispersion); 20 g
2. Deionized water; 39.5 g 3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition XXIV
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. TPU6511B (0-100 micron) polyurethane powder supplied by Fixatti (polymer powder); 20 g
5. Altoma clear conc #1953 acrylic emulsion thickener supplied by Bolger & O'Hearn (thickener); 0.5 g Adhesive Composition XXV
Components:
1. Dispercoll XP 2682 and Dispercoll U56 (50%/50%) supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition XXVI
Components:
1. Dispercoll XP 2682 supplied by Covestro and Sancure 20025F supplied by Lubrizol (50%/50%) (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition XXVII
Components:
1. Dispercoll U56 supplied by Covestro and Acronal A310S supplied by BASF (50%/50%) (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Procedure to Prepare the Adhesive Compositions:

Weigh liquid components 1, 2 & 3 into a 250 ml polyethylene vessel and secure the vessel under a mixer inside a fume hood. Lower the saw tooth agitator blade on the mixer until it is just under the liquid surface and start the agitator at 1000 rpm so as to create a smooth vortex. Pre-weigh the powder (component 4) into a separate 250 ml container. Add the powder to the moving vortex of components 1, 2 & 3 slowly. Lastly, add a portion of the thickener(s) (components 5 (and 6)) last, slowly into the moving vortex, dropwise. Mix at 1000 rpm for 10 mins. Stop the mixer and remove the sample vessel to allow measurement of the viscosity before all of the thickener has been added so as not to over shoot the desired final viscosity. Add further thickener(s) with mixing as required.

Example 2: Adhesive Bond Strength Testing by Instron T-Peel Test

Material Preparation:

Different adhesive formulations (as identified in Example 1) are jetted as dots onto a first textile fabric and air dried (ambient conditions) for a period of at least 15 minutes. The first textile fabric was then bonded to a second textile fabric of the same type and orientation. The bonding of the textile fabrics occurred using a Geo Knight heat seal press (model KD20SP). The set conditions for the heat seal press were 150C/20 second dwell time/60 psi. The glue line temperature (GLT) was measured at 135C. Thermolabel temperature sensitive tapes from Paper Thermometer Co. (set number 4) were used.

Instron T-Peel Test:

Bond strengths of various adhesive formulations are measured using an Instron 5544, load cell 500N, pursuant to ASTM D1876-01 Standard Method for Peel Resistance of Adhesives (T-peel test). The bond strength data was given 24 hours after the bond was made, and a second set of samples was tested after 24 hours, as well as a 10× wash cycle at 60C, dry cycle also at 60C using a Miele professional PW 6065 Plus washer & a standard household dryer (Kenmore).

Testing Protocol:
1. Cut out three test pieces from the bonded textile sample, each 25 mm (1 inch) wide and 200 mm (8") long.
2. Mount the first test piece centrally with the un-bonded ends secured centrally in the machine clamps with tension applied evenly across the width.
3. Operate the tensile tester until 150 mm (6 inches) extension is reached then interrupt the test. Record the average of peaks and max force achieved in lb/inch (or N/mm).
4. Repeat for test pieces 2 and 3.
5. When peel strength values have been determined for all three test pieces, calculate the overall max and peak values for the three test pieces.

Results:

Bond strength testing results for different adhesive compositions (identified by relevant number from Example 1) are provided in the table below. In addition, bond strength testing results are provided for three solid films for comparison (SewFree 3414, SewFree 3412, and SewFree BFF3001 supplied by Bemis Associates). Testing results were obtained before washing the bonded textile (BW) and after washing the bonded textile (AW) (10 cycles 60C/low heat dry). The solid films were all tested before wash.

| | stretch knit PA/Elastan (80/20%) 120 gsm | | Cotton/Spandex (95%/5%) knit 220 gsm | | stretch knit PA/Elastan (72/28%) 170 gsm | | 3 Layer fourway-stretch polyester knit 245 gsm | |
|---|---|---|---|---|---|---|---|---|
| Composition # | BW Dots | AW Dots | BW Dots | AW Dots | BW Dots | AW Dots | BW Dots | AW Dots |
| #1 | 3.22 | 1.60 | 2.93 | 1.72 | 3.22 | 2.61 | 8.31 | 6.59 |
| #2 | 3.75 | 4.00 | 4.38 | 4.05 | 4.73 | 4.11 | 2.59 | 2.53 |
| #3 | 5.32 | 3.56 | 6.48 | 3.46 | 6.34 | 4.26 | 6.52 | 4.27 |
| #11 | 5.15 | 3.40 | 6.17 | 4.93 | 5.07 | 4.77 | 8.29 | 6.88 |
| #12 | 3.00 | 0.00 | 1.17 | 0.00 | 2.06 | 0.00 | 7.56 | 7.42 |
| #14 | 2.04 | 0.00 | 0.41 | 0.00 | 1.26 | 0.00 | 4.01 | 0.00 |
| #18 | 4.58 | 4.15 | 7.47 | 4.40 | 6.02 | 5.10 | 8.71 | 5.41 |
| #19 | 3.76 | 3.62 | 4.80 | 3.90 | 4.64 | 3.40 | 3.17 | 3.61 |
| #20 | 4.76 | 3.00 | 8.02 | 3.05 | 5.70 | 3.25 | 8.75 | 4.45 |
| #21 | 5.48 | 2.25 | 3.51 | 0.00 | 2.07 | 0.00 | 8.13 | 6.05 |
| #22 | 3.78 | 2.38 | 5.08 | 2.33 | 3.01 | 1.52 | 3.05 | 1.86 |
| #23 | 4.75 | 3.27 | 6.60 | 2.44 | 5.48 | 0.00 | 4.70 | 0.00 |
| #24 | 4.01 | 2.63 | 5.32 | 4.50 | 5.15 | 3.44 | 4.97 | 4.51 |
| #25 | 3.39 | 1.01 | 4.16 | 2.82 | 2.67 | 0.00 | 3.95 | 1.95 |
| #26 | 2.51 | 1.39 | 1.47 | 0.59 | 2.53 | 1.58 | 1.61 | 0.79 |
| #27 | 1.98 | 1.27 | 6.49 | 3.80 | 4.52 | 2.96 | 4.60 | 2.32 |

| | stretch knit PA/Elastan (80/20%) 120 gsm | Cotton/ Spandex (95%/5%) knit 220 gsm | stretch knit PA/Elastan (72/28%) 170 gsm | 3Layer fourway-stretch polyester knit 245 gsm |
|---|---|---|---|---|
| Solid films: | Film | Film | Film | Film |
| 3415 3 mil | 5.83 | 4.38 | 4.35 | 11.43 |
| 3412 2 mil | 2.88 | 1.73 | 1.33 | 7.07 |
| BFF3001 | 2.61 | 1.13 | 1.15 | 9.96 |

What is claimed is:

1. An adhesive composition for textiles comprising:
an aqueous polymer dispersion;
a dispersed polymer powder, wherein the polymer powder has a particle size of about 0 microns to about 250 microns;
a dispersing agent; and
a thickener,
wherein the adhesive composition has a viscosity within the range of 8000 cps to 12000 cps thereby facilitating the deposition of the adhesive composition as dots to sit on a surface of a textile.

2. The adhesive composition of claim 1, wherein the aqueous polymer dispersion is selected from the group consisting of aqueous polyurethane-urea anionomer dispersions, aqueous acrylic emulsions, aqueous styrene acrylic emulsions, aqueous acrylic vinyl acetate emulsions, aqueous epoxy dispersions, aqueous polyamide dispersions, aqueous polyester dispersions, and combinations thereof.

3. The adhesive composition of claim 1, wherein the aqueous polymer dispersion is a polyurethane dispersion.

4. The adhesive composition of claim 1, wherein the aqueous polymer dispersion is an aliphatic polyester polyurethane dispersion.

5. The adhesive composition of claim 1, wherein the aqueous polymer dispersion is an acrylic emulsion.

6. The adhesive composition of claim 1, wherein the aqueous polymer dispersion is a blend of two or more polyurethane dispersions.

7. The adhesive composition of claim 1, wherein the aqueous polymer dispersion is a blend of a polyurethane dispersion and an acrylic emulsion.

8. The adhesive composition of claim 1, wherein the aqueous polymer dispersion is a polyurethane dispersion which can act as a dispersant capable of stabilizing a dispersion of a polymeric powder in water.

9. The adhesive composition of claim 1, wherein the polymer powder is selected from the group consisting of co-polyesters, polyester urethanes, polyether urethanes, ethylene vinyl acetates, co-polyamides, polyamides, polyureas, polyolefins, polycarbonate urethanes, epoxy polyesters, and combinations thereof.

10. The adhesive composition of claim 1, wherein the polymer powder is a polyamide.

11. The adhesive composition of claim 1, wherein the polymer powder is a polyurethane powder.

12. The adhesive composition of claim 1, wherein the polymer powder is a polycarbonate urethane.

13. The adhesive composition of claim 1, wherein the polymer powder is present in the adhesive composition in an amount of about 10 wt % to about 40 wt %.

14. The adhesive composition of claim 1, wherein the polymer powder is present in the adhesive composition in an amount of about 15 wt % to about 35 wt %.

15. The adhesive composition of claim 1, wherein the polymer powder is present in the adhesive composition in an amount of about 20 wt % to about 30 wt %.

16. The adhesive composition of claim 1, wherein the dispersing agent is selected from the group consisting of a surfactant, a polymer dispersant, and combinations thereof.

17. The adhesive composition of claim 1, wherein the dispersing agent is selected from the group consisting of a non-ionic surfactant, anionic surfactant, and combinations thereof.

18. The adhesive composition of claim 1, wherein the dispersing agent is selected from the group consisting of an acrylic polymer, a polyurethane, and combinations thereof.

19. The adhesive composition of claim 1, wherein the dispersing agent is present in the adhesive composition in an amount of about 0.1 wt % to about 2.0 wt %.

20. The adhesive composition of claim 1, wherein the dispersing agent is present in the adhesive composition in an amount of about 0.5 wt % to about 1.5 wt %.

21. The adhesive composition of claim 1, wherein the dispersing agent is present in the adhesive composition in an amount of about 0.8 wt % to about 1.2 wt %.

22. The adhesive composition of claim 1, wherein the thickener is a water based acrylic.

23. The adhesive composition of claim 1, wherein the thickener is selected from the group consisting of a hydrophobically modified ethoxylated urethane (HEUR) thickener, a hydrophobically modified alkali swellable emulsion (HASE) thickener, a hydroxyethyl cellulose (HEC) thickener, a cellulosic thickener, an inorganic thickener, and combinations thereof.

24. The adhesive composition of claim 1, wherein the thickener is present in the adhesive composition in an amount of about 0.1 wt % to about 2.0 wt %.

25. The adhesive composition of claim 1, wherein the thickener is present in the adhesive composition in an amount of about 0.3 wt % to about 0.7 wt %.

26. The adhesive composition of claim 1, further comprising an additive.

27. The adhesive composition of claim 26, wherein the additive promotes flocculation.

28. The adhesive composition of claim 26, wherein the additive is a polyethyleneimine.

29. The adhesive composition of claim 26, wherein the additive is present in the adhesive composition in an amount of about 0 wt % to about 2 wt %.

30. The adhesive composition of claim 26, wherein the additive is present in the adhesive composition in an amount of about 0 wt % to about 1 wt %.

31. The adhesive composition of claim 26, wherein the additive is present in the adhesive composition in an amount of about 0 wt % to about 0.5 wt %.

32. The adhesive composition of claim 1, further comprising a crosslinking agent.

33. The adhesive composition of claim 32, wherein the crosslinking agent is selected from the group consisting of blocked or encapsulated multi-functional isocyanate, carbodiimides, Schiffs-base crosslinkers, alkyd modified polyurethanes, aceto-acetate functional polymers combined with multi-functional polyamines, and UV crosslinkers.

34. The adhesive composition of claim 1, wherein the aqueous polymer dispersion includes a carbodiimide crosslinker.

35. The adhesive composition of claim 1, wherein the adhesive composition does not include a cross linking agent.

36. The adhesive composition of claim 1, wherein the adhesive composition has a solids content of about 5 wt % to about 55 wt %.

37. The adhesive composition of claim 1, wherein the adhesive composition has a solids content of about 15 wt % to about 20 wt %.

38. The adhesive composition of claim 1, wherein the adhesive composition comprises the aqueous polymer dispersion and the polymer powder at a ratio range of about 1:0.2 to about 1:1.15.

39. The adhesive composition of claim 1, wherein the adhesive composition comprises the aqueous polymer dispersion and the polymer powder at a ratio range of 1:0.3 to about 1:1.2.

40. The adhesive composition of claim 1, wherein the adhesive composition comprises the aqueous polymer dispersion and the polymer powder at a ratio of 1:0.38.

41. The adhesive composition of claim 1, wherein the adhesive composition comprises the aqueous polymer dispersion and the polymer powder at a ratio of 1:1.14.

\* \* \* \* \*